US006498888B1

(12) United States Patent
Chenard et al.

(10) Patent No.: US 6,498,888 B1
(45) Date of Patent: *Dec. 24, 2002

(54) HIGH-ATTENUATION FIBER WITH CLADDING MODE SUPPRESSION FOR ALL-FIBER OPTICAL ATTENUATOR

(75) Inventors: François Chenard, Sainte-Foy (CA); André Croteau, Saint-Agapit (CA)

(73) Assignee: Institut National D'Optique, Quebec (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,298

(22) Filed: Apr. 22, 1998

(51) Int. Cl.⁷ .................................................. G02B 6/02

(52) U.S. Cl. ..................... 385/127; 385/140; 385/123

(58) Field of Search ................................ 385/140, 127, 385/126, 128, 123

(56) References Cited

U.S. PATENT DOCUMENTS

| 3,859,073 A | 1/1975 | Schultz ........................... 65/60 |
| 4,787,927 A | 11/1988 | Mears et al. ................... 65/3.12 |
| 4,799,946 A | 1/1989 | Ainslie et al. ................. 65/3.12 |
| 4,877,306 A | 10/1989 | Kar ........................... 350/96.33 |
| 4,881,793 A | 11/1989 | Tarbox ....................... 350/96.21 |
| 5,047,076 A | 9/1991 | Cognolato et al. ............ 65/3.12 |
| 5,241,613 A | 8/1993 | Li et al. .......................... 385/78 |
| 5,572,618 A | 11/1996 | Digiovanni et al. ......... 385/140 |
| 5,633,974 A | 5/1997 | Chia ............................. 385/140 |
| 5,712,941 A | * 1/1998 | Imoto et al. ................. 385/126 |
| 5,841,926 A | * 11/1998 | Takeuchi et al. ............. 385/123 |

OTHER PUBLICATIONS

Perturbation Theory of a Doubly Clad Optical Fiber with a Low–Index Inner Cladding, Shojiro Kawakami and Shigeo Nishida, IEEE Journal of Quantum Electronics, vol. Q–E–11, No. 4, Apr. 1975.

Modal Noise in Single–Mode Fibers Operated Slightly Above Cutoff, S. Heckmann, Electronics Letters, Jul. 9, 1981, vol. 17, No. 14.

Propagation in Doubly Clad Single–Mode Fibers, Michel Monerie, IEEE Journal of Quantum Electronics, vol. QE–18, No. 4, Apr. 1982.

Modal Interference in a Short Fiber Section: Fibres Length, Splice Loss, Cutoff, and Wavelength Dependences, Koichi Abe, Yves Lacroix, Lee Bonnell, and Zdzislaw Jakubczyk, Journal of Lightwave Technology, vol. 10, No. 4, Apr. 1992.

Optical Absorption of the Transition Elements in Vitreous Silica, Peter C. Schultz, Journal of the American Ceramic Society–Schultz, vol. 57, No. 7.

* cited by examiner

Primary Examiner—Ellen E. Kim
(74) Attorney, Agent, or Firm—Merchant & Gould P.C.

(57) ABSTRACT

Disclosed is an optical device which combines a controlled level of attenuation, a high degree of wavelength insensitivity and a substantial decrease in modal interference problems. The optical device has a core having a core diameter and a core refractive index; an inner cladding having an inner cladding outer diameter less than ten times the core diameter and a refractive index less that the core refractive index; and an outer cladding having a refractive index higher that the inner cladding refractive index. At least one part of the core, the inner cladding or the outer cladding is doped with at least one absorbing element. Preferably, the core is doped with cobalt in an appropriate concentration, providing the same degree of attenuation at 1310 nm and 1550 nm, while also considerably reducing modal interference. The optical device can be used as an attenuator between a transmission fiber and a detection fiber or can be used to couple a transmission fiber directly to a detector.

2 Claims, 2 Drawing Sheets

HIGH-ATTENUATION FIBER WITH CLADDING MODE SUPPRESSION FOR ALL-FIBER OPTICAL ATTENUATOR

FIELD OF THE INVENTION

The present invention relates to optical fiber attenuators for attenuation of optical signal communications and for the reduction of modal interference in such optical fiber attenuators.

DESCRIPTION OF THE PRIOR ART

It is common knowledge in the art that an optical fiber doped with transition metal elements will exhibit a high transmission loss. A method of incorporating a transition metal element in a glass body produced by the flame hydrolysis technique is described in U.S. Pat. No. 3,859,073 to SCHULTZ.

Also known in the art is the optical absorption of the transition metal elements in vitreous silica, as described by Peter C. SCHULTZ in "Optical Absorption of the Transition Elements in Vitreous Silica", J. Am. Ceram. Soc., Vol. 57, No. 7, pp. 309–313, 1974.

Knowledge of this has permitted the manufacture of high-attenuation fibers. These high-attenuation fibers can be tailored to produce a controlled level of attenuation with a high degree of wavelength insensitivity, by properly selecting the material used as a dopant, the dopant concentration and the length of the attenuation fiber.

A high-attenuation fiber is used to produce optical fiber attenuators which can be inserted in optical transmission systems to attenuate the amount of optical power present in a fiber link. The most common use for a high attenuation fiber is to either attenuate the detected optical signal level down to a receiver's optimum detection sensitivity, or to act as a reflection-less terminator at the end of unused fibers. Examples of high attenuation fibers, and methods for making the same are described in U.S. Pat. No. 4,881,793 (Tarbox); U.S. Pat. No. 5,572,618 (DiGiovanni et al.); and U.S. Pat. No. 5,633,974 (Chia). Essentially, these high-attenuation fibers are made of a single-mode fiber, where the core is doped with, usually, a transition metal in order to increase the absorption in the core.

The high-attenuation fibers are usually a few centimeters long and are provided with connectors at each end to facilitate connection to a low-loss optical fiber. The fabrication of the high-attenuation fiber connectors implies the assembly of the high-attenuation fiber secured in a connector ferrule of precise diameter. The high-attenuation fiber is thus usually connected between the output end connector of a transmission fiber and the input end connector of a detection fiber.

The tolerance on standard fiber diameters is usually less than ±1 micron and the core-cladding concentricity is better than 1 micron. Also, the tolerance on the ferrule hole diameter is usually better than ±0.5 micron. Generally, a fiber with small diameter will be off-centered in the ferrule of bigger hole diameter. Thus, two connectors made with the same (or different) fibers, will usually exhibit offset-induced losses when they are connected together.

This phenomenon is known in the art and may cause modal interference. It has been found that when a short piece of single-mode fiber is connected between a transmission fiber and a detection fiber, most of the optical power of the fundamental mode of the transmission fiber is coupled into the fundamental mode of the short piece of fiber. However, because of the small discontinuity due to the misalignment of the joint, some of the power of the fundamental mode of the transmission fiber is coupled into higher-order modes of the short piece of fiber. The fundamental mode and the higher-order modes propagate along the short fiber piece with different propagation delays and reach the junction of the short fiber piece and the detection fiber out of phase. Again, most of the optical power of the fundamental mode of the short fiber piece is coupled into the fundamental mode of the detection fiber. Also, because of a misaligned joint, some of the optical power of the higher-order modes of the short piece of fiber is coupled into the fundamental mode of the detection fiber, where it interferes with the optical power coupled from the fundamental mode of the short piece of fiber. The out-of-phase component varies with wavelength and results in an interference effect that can be observed as an oscillation in the detected signal from the detection fiber measured as a function of wavelength. For a greater discussion on modal interference, see S. HECKMANN, "Modal Noise in Single-Mode Fibres Operated Slightly Above Cutoff", Elect. Let., Vol. 17, No. 14, pp. 499–500, 1981, and K. ABE, Y. LACROIX, L. BONNELL and Z. JAKUBCZYK, "Modal Interference in a Short Fiber Section: Fiber Length, Splice Loss, Cutoff and Wavelength Dependences", J. Light. Technol., Vol. 10, No. 4, pp. 401–406, 1992.

Modal interference is practically unpredictable and is of great concern to the optical fiber systems designers. The common solution to the modal interference problem is to use at least a one meter long fiber piece after each discontinuity (connector or splice) to eliminate the optical power coupled into the higher-order modes. Other solutions have been proposed with a special fiber design to control modal noise in short fiber sections. One such design includes an outer cladding layer that has a high refractive index and a high attenuation (see for example U.S. Pat. No. 4,877,306 to KAR). The outer cladding effectively traps higher-order modes. Another proposed solution has been to use doubly clad optical fibers with a low-index inner cladding. Such a fiber is usually referred to as a W-type fiber. This type of fiber increases the transmission loss of the higher-order modes and encourages leakage of such higher-order modes in the outer cladding. For a detailed discussion on the propagation in doubly-clad single mode fibers, see M. MONERIE, "Propagation in Doubly Clad Single-Mode Fibers", IEEE J. Quantum Electronics, Vol. QE-18, No. 4, pp. 535–542, 1982 and S. KAWAKAMI and S. NISHIDA, "Perturbation Theory of a Doubly Clad Optical Fiber with a Low-index Inner Cladding", IEEE J. Quantum Electronics, Vol. QE-11, No. 4, pp. 130–138, 1975.

An example of the use of this design can be found in U.S. Pat. No. 5,241,613 (Li et al.), in order to reduce modal interference.

However, to Applicant's knowledge, no fiber design has been proposed which attenuates the fundamental mode and reduces modal interference in the same device of relatively small length.

SUMMARY OF THE INVENTION

It is thus an object of the invention to provide an optical attenuating element which also reduces modal interference, and more specifically, an optical device which combines a controlled level of attenuation, a high degree of wavelength insensitivity and a substantial decrease in modal interference problems. In accordance with the invention, this object is achieved with an optical attenuating element for attenuating and eliminating modal interference comprising a core having a core diameter and a core refractive index; an inner cladding having an inner cladding outer diameter less than ten times the core diameter and a refractive index less than the core refractive index; and an outer cladding having a refractive index higher than the inner cladding refractive index; where at least one part of at least one of said core, said inner cladding and said outer cladding is doped with at least one absorbing element.

BRIEF DESCRIPTION OF THE DRAWINGS

The present invention and its advantages will be more easily understood after reading the following non-restrictive description of preferred embodiments thereof, made reference to the following drawings in which.

DESCRIPTION OF A PREFERRED EMBODIMENT OF THE INVENTION

The invention is a combination high-attenuation fiber (HAF) which also reduces modal interference. The optical element according to the invention will therefore hereinafter be referred to as a high-attenuation fiber with cladding mode suppression (HAF-CMS).

Figure 1:
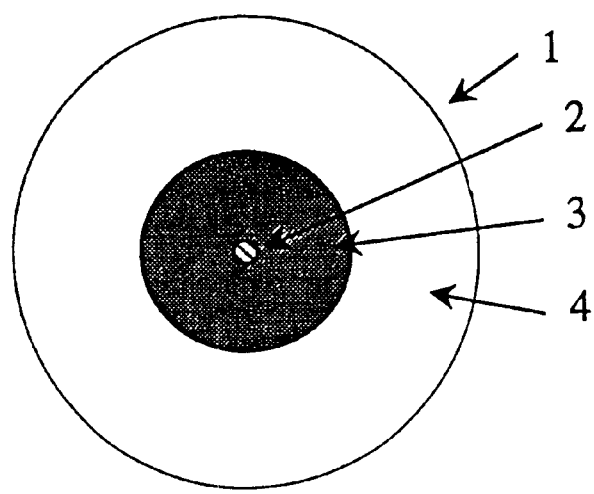
FIG. 1 is a cross-sectional view of a W-type fiber for use as an optical attenuator according to the present invention.

The optical attenuator according to the invention is a W-type fiber 1 shown on FIG. 1, i.e. a doubly clad fiber. The fiber 1 has a core 2 having a core diameter, an inner cladding 3 having an inner cladding outer diameter less than ten times the core diameter and a refractive index less than the core refractive index and an outer cladding 4 having a refractive index higher than the inner cladding refractive index.

Figure 2:
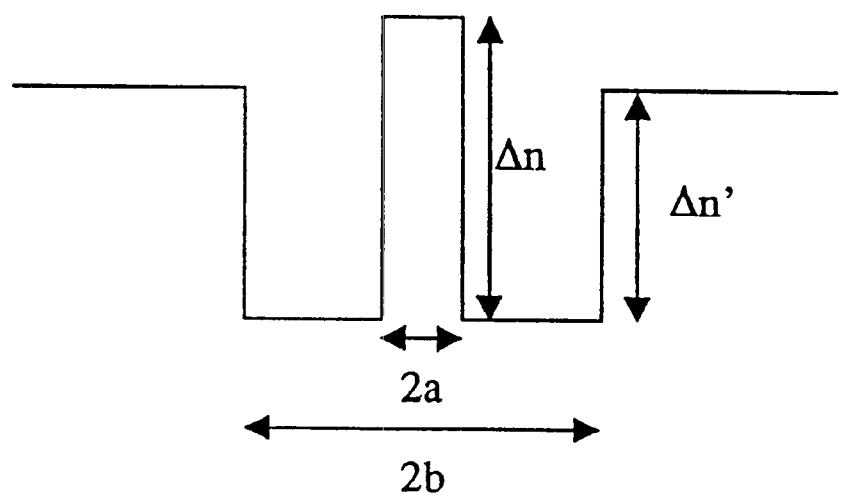
FIG. 2 is a schematic representation of the refractive index profile for the optical attenuator of FIG. 1.

In order to more properly illustrate the refractive index change, FIG. 2 is a schematic representation of the refractive index profile for the fiber of FIG. 1. As can be seen, the center portion of the Figure shows the refractive index for the core. The refractive index drops by $\Delta n$ amount An and the lower portion represents the refractive index for the inner cladding. The refractive index increases by an amount $\Delta n'$ and the higher portion represents the refractive index for the outer cladding. As can be seen, the refractive index for the inner cladding is the lowest, while the refractive index for the outer cladding is higher than the refractive index of the inner cladding. This diagram is a typical representation of a W-type fiber.

The invention lies in the addition of an absorbing element in at least one part of the core, the inner cladding or the outer cladding of the optical attenuator. Preferably, it is the core which is doped with the absorbing element. It should be stressed that the absorbing element can be located in a part of the core, such as the center of the core or the circumference of the core, in a radial manner. It should further be noted that the absorbing element can also be located in a part of the inner cladding or a part of the outer cladding, again in a radial manner.

The absorbing element can be a transition-metal element (Ti, V, Cr, Mn, Fe, Co, Ni, Cu, Zn), a rare-earth element (Sc, Y, La, Ce, Pr, Nd, Pm, Sm, Eu, Gd, Tb, Dy, Ho, Er, Tm, Yb, Lu) or any other absorbing element. The concentration and selection of a given dopant will affect the level of attenuation at a given wavelength. However, the results shown in the following table were obtained by doping the core with cobalt (Co) at a concentration of 650 ppm-weight. Cobalt, in this case, was chosen for its attenuation properties, in that substantially the same degree of attenuation is present at standard telecommunications wavelengths of 1310 nm and 1550 nm.

It should also be noted that the other dopants which appear in the following table are used to effect a change in the index of refraction of the various portions of the fiber, and that the invention lies in the incorporation of an absorbing element which does not affect the index of refraction of the portion of the fiber in which it is placed. Thus, fused silica glass index-raising dopants like germanium, or others, and index-lowering dopants like fluorine, or others, can be used to produce the desired doubly-clad fiber profile with low-index inner cladding.

As mentioned above, the following table illustrates the effectiveness of a doubly-clad fiber with a core dopant, versus a traditional high-attenuation fiber. It should be reminded that the traditional high-attenuation fiber does not reduce modal interference.

TABLE 1

| Fiber type | HAF | HAF-CMS |
|---|---|---|
| Core diameter (2a) (micron) | 9.0 | 9.1 |
| Silica core dopants | Ge/P/Co | P/Co |
| Inner cladding dopant | — | F/P |
| Inner cladding outer diameter (2b) (micron) | — | 45 |
| $\Delta n$ | 0.0051 | 0.0046 |
| $\Delta n'$ | — | −0.0034 |
| Fiber diameter (micron) | 125 | 125 |
| Attenuation at 1310 nm (dB/m) | 343.5 | 360.9 |
| Attenuation at 1550 nm (dB/m) | 352.2 | 343.5 |

Figure 3:
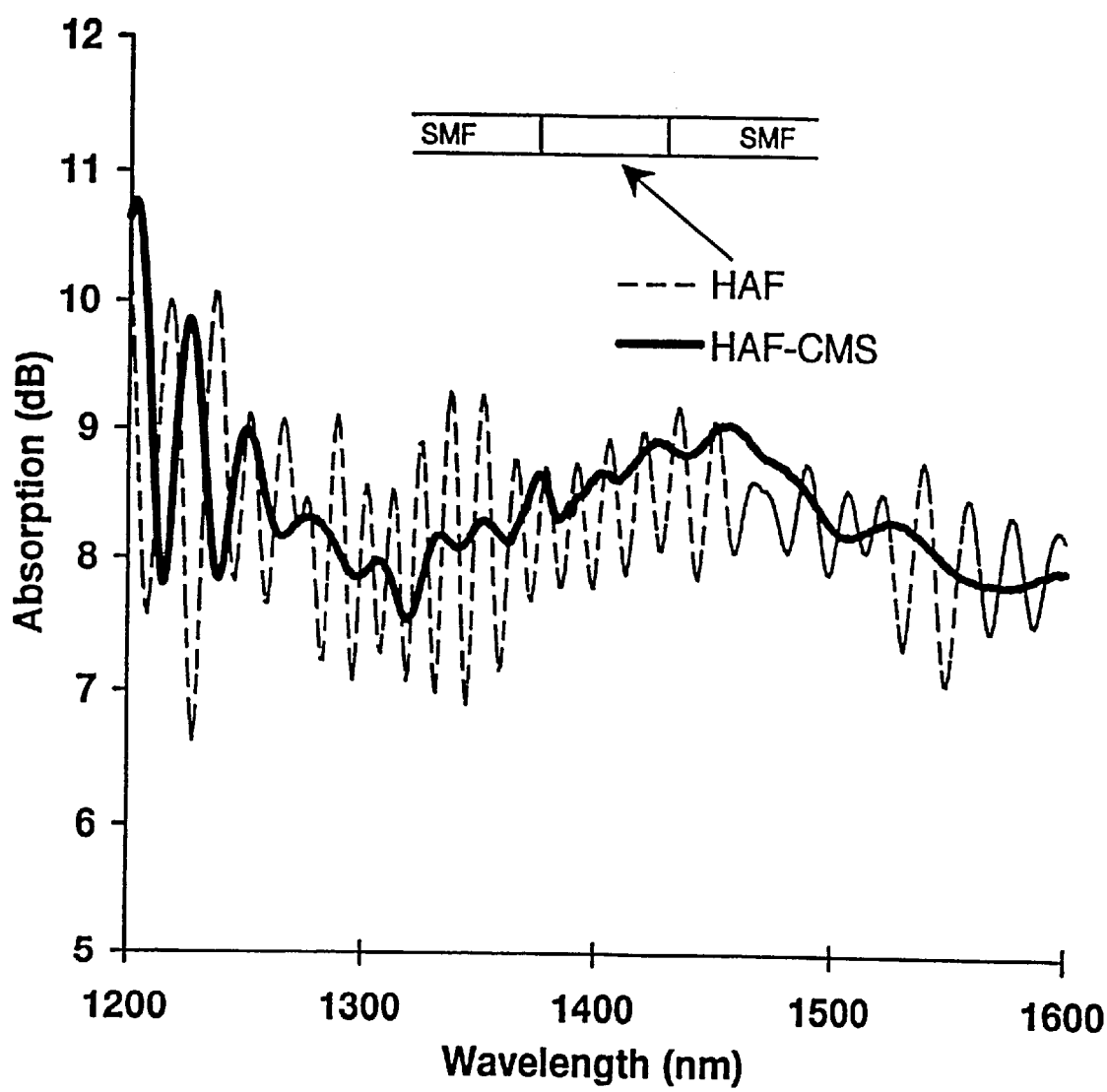
FIG. 3 is a graph showing the absorption as a function of wavelength for a standard high-attenuation fiber (broken line) and for a high-attenuation fiber with cladding mode suppression (solid line) according to the invention.

As can be seen, both the HAF (standard high-attenuation fiber) and the HAF-CMS (high-attenuation fiber with cladding mode suppression) provide essentially the same degree of attenuation at 1310 nm and 1550 nm, which are the two standard wavelengths for telecommunications systems. The attenuation remains substantially constant at optical powers up to 200 mW. However, referring now to FIG. 3 which is a plot of the absorption versus wavelength, it can be seen that the HAF-CMS according to the invention does not exhibit the same modal interference as a standard HAF. More particularly, the HAF-CMS (shown in solid black line) considerably reduces modal interference, while at the same time providing for the same degree of attenuation as the HAF (shown in broken line). Thus, the HAF-CMS according to the invention is suitable not only as an attenuating element, but provides the additional advantage of reducing modal interference, in a short length stub.

These results were obtained by butt-coupling a HAF between two standard single-mode fibers (SMF) and by butt-coupling a HAF-CMS between two standard single-mode fibers (SMF). Both the HAF and the HAF-CMS had a length in the order of 2.5 cm.

The additional advantage of the HAF-CMS is that it is relatively short, i.e. in the order of a few centimeters depending on the attenuation per unit length. Therefore, the HAF-CMS is suitable for forming compact attenuators that show much less modal interference problems that other attenuators made from singly-clad HAF. Optical attenuators made according to the present invention show quantifiable benefits for standard telecommunications single-mode fiber applications: low back-reflection (less than −50 dB), same attenuation at 1310 nm and 1550 nm (±0.025 dB/dB), small modal interference effects (less than 0.05 dB/dB), which no other presently available fiber design can offer simultaneously. The optical attenuator according to the invention can be used either in-line or at the end of a transmission fiber to attenuate the transmitted optical signal to a desired level, or to act as a reflection-less terminator at the end of unused fibers.

It is preferable for the optical attenuator of the invention to provide for at least 1 dB of attenuation per meter, although Table 1 shows that the optical attenuator can provide for much higher attenuations.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. An optical attenuating element for attenuating and eliminating modal interference consisting of:

a core having a core diameter and a core refractive index, said core refractive index being constant throughout said core;

a single inner cladding having an inner cladding outer diameter less than ten times the core diameter and a refractive index less than the core refractive index, said inner cladding refractive index being constant throughout said inner cladding; and a single outer cladding having a refractive index higher than the inner cladding refractive index and less than the core refractive index, said outer cladding refractive index being constant throughout said outer cladding;

wherein only a part of said core is doped with cobalt.

2. An optical attenuating element according to claim 1, wherein said optical attenuating element has an attenuation of at least 1 dB per meter.

* * * * *